(12) United States Patent
Yamada et al.

(10) Patent No.: US 9,238,428 B2
(45) Date of Patent: Jan. 19, 2016

(54) BACK FRAME FOR VEHICLE SEAT

(71) Applicant: TOYOTA BOSHOKU KABUSHIKI KAISHA, Aichi-ken (JP)

(72) Inventors: Nobuhiro Yamada, Kakamigahara (JP); Fumitoshi Akaike, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/309,097

(22) Filed: Jun. 19, 2014

(65) Prior Publication Data
US 2014/0375106 A1 Dec. 25, 2014

(30) Foreign Application Priority Data

Jun. 21, 2013 (JP) ................. 2013-130433

(51) Int. Cl.
*B60N 2/68* (2006.01)
*B60N 2/22* (2006.01)
*B60N 2/225* (2006.01)
*B60N 2/235* (2006.01)
*B60N 2/427* (2006.01)

(52) U.S. Cl.
CPC .. *B60N 2/68* (2013.01); *B60N 2/22* (2013.01); *B60N 2/2252* (2013.01); *B60N 2/682* (2013.01); *B60N 2/2356* (2013.01); *B60N 2/42745* (2013.01)

(58) Field of Classification Search
CPC ...... B60N 2/682; B60N 2/072; B60N 2/2252; B60N 2/2356; B60N 2002/024; B60N 2/42745; Y10T 74/20516

USPC .............. 297/452.18, 440.2, 452.2
See application file for complete search history.

(56) References Cited

U.S. PATENT DOCUMENTS

| | | | | |
|---|---|---|---|---|
| 4,787,756 A | * | 11/1988 | Pilarski | B60N 2/0705 384/47 |
| 2003/0067205 A1 | * | 4/2003 | Eppert et al. | 297/463.1 |
| 2003/0117003 A1 | * | 6/2003 | Fourrey et al. | 297/452.18 |
| 2004/0227389 A1 | * | 11/2004 | Yoshida | 297/452.18 |
| 2008/0238172 A1 | * | 10/2008 | Maeda et al. | 297/362 |
| 2009/0289488 A1 | * | 11/2009 | Mitsuhashi | 297/354.12 |
| 2011/0227386 A1 | * | 9/2011 | Berndtson et al. | 297/354.1 |
| 2013/0291676 A1 | * | 11/2013 | Pleskot | B60N 2/22 74/511 R |
| 2014/0232161 A1 | * | 8/2014 | Mitsuhashi | 297/452.18 |

FOREIGN PATENT DOCUMENTS

| | | |
|---|---|---|
| DE | 29816819 | 1/1999 |
| JP | 2010-221935 | 10/2010 |
| JP | 2011-116303 | 6/2011 |

\* cited by examiner

*Primary Examiner* — Joshua J Michener
*Assistant Examiner* — Matthew Gitlin
(74) *Attorney, Agent, or Firm* — Greenblum & Bernstein, P.L.C.

(57) ABSTRACT

There is provided a back frame of a vehicle seat, which includes a frame body formed by extrusion molding and including a press-fitting portion into which a part attachment bracket is press-fitted for attaching a part to the frame body. The press-fitting portion of the frame body and an abutment surface of the bracket are formed with an engagement portion where one of the frame body and the bracket is brought into engagement with the other in a direction in which the part attachment bracket is press-fitted into the press-fitting portion.

10 Claims, 13 Drawing Sheets

BACK FRAME FOR VEHICLE SEAT

BACKGROUND OF THE INVENTION

1. Field of the Invention

The present invention relates to a back frame for a seat which is mounted in a vehicle such as an automobile, airplane, ship, train, or the like.

2. Description of the Related Art

There has been known a back frame which is a framework of a seat back of a vehicle seat, and which is formed by bending an extruded member (refer to DE29816819). In this back frame, a recliner mounting bracket (hereinafter, referred to as a bracket) is fixed by welding to a frame body which is formed by extrusion molding.

SUMMARY OF THE INVENTION

However, the welding method for fixing the bracket to the frame body is preferably avoided when taking the productivity into consideration. For example, when the frame body and the bracket are made of different materials, that is, for example, when the frame body is made of aluminum and the bracket is made of iron, the productivity of the welding fixing method becomes worse. Accordingly, it is considered to fix the bracket to the frame body by press-fitting (not known).

Further, in a case where an excessively large load is applied to a seat back due to a collision of a vehicle, when the press-fitted bracket is subject to a load acting in a direction in which the bracket is removed from the frame body, there would be a fear that the fixing strength of the bracket to the frame body becomes insufficient.

The present invention has been made in view of the above circumstances, and an object of the present invention is to ensure a strength required by a back frame while taking the productive of the back frame into consideration by enhancing the connecting strength of a bracket to a frame body in a direction in which the bracket is press-fitted.

According to an illustrative embodiment of the present invention, there is provided a back frame of a vehicle seat, the back frame comprising a frame body formed by extrusion molding and including a press-fitting portion into which a part attachment bracket is press-fitted for attaching a part to the frame body, wherein the press-fitting portion of the frame body and an abutment surface of the bracket are formed with an engagement portion where one of the frame body and the bracket is brought into engagement with the other in a direction in which the part attachment bracket is press-fitted into the press-fitting portion.

According to the above configuration, the engagement portion where one of the frame body and the bracket is brought into engagement with the other in the press-fitting direction, and therefore, the connecting strength of the bracket to the frame body in the press-fitting direction can be enhanced, thereby making it possible to ensure the strength required by the back frame. Further, since the welding method is not used, the productivity can be improved.

In the above back frame, the press-fitting portion of the frame body and the abutment surface of the bracket may be formed with a plurality of engagement portions along the press-fitting direction.

According to the above configuration, since the plurality of engagement portions are formed along the press-fitting direction, a load applied to one of the engagement portions can be dispersed. Thus, even though the load resistance of each of the engagement portions is small, the engagement portions can withstand a larger load altogether.

In the above back frame, the engagement portion may include: a through hole formed in the abutment surface of the bracket to penetrate through the abutment surface in a direction which is perpendicular to the press-fitting direction, and a projection formed in the press-fitting portion of the frame body to fit in the through hole.

According to the above configuration, the projection on the frame body fits in the through hole in the bracket, whereby the bracket and the frame body are brought into engagement with each other. The projection may be fitted into the through hole by pressing a portion of the frame body which corresponds to the through hole after the through hole is formed in the bracket, and the bracket is press-fitted into the press-fitting portion of the frame body. Thus, the engagement portion can be formed easily.

Moreover, since the through hole is formed to penetrate in the direction which is perpendicular to the press-fitting direction, the projection which is fitted into the through hole is formed to project in the same direction, thereby making it possible to enhance the fixing strength against the load acting in the direction in which the bracket is removed from the frame body.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Figure 1:
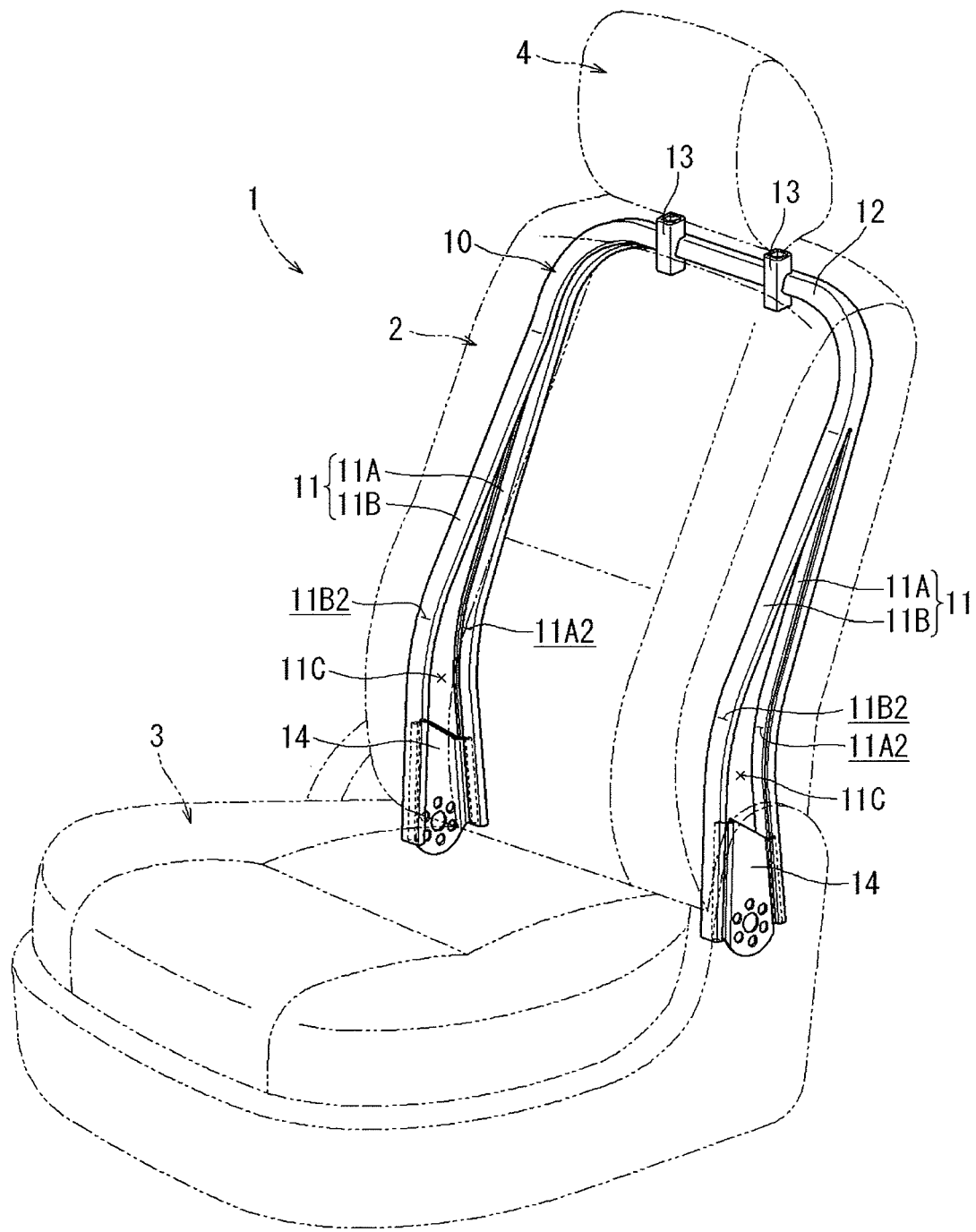
FIG. 1 is an outer perspective view of a vehicle seat including a back frame according to an illustrative embodiment of the present invention.

Referring to FIGS. 1 to 14, the configuration of a back frame 10 according to an illustrative embodiment of the present invention will be described. As shown in FIG. 1, the back frame 10 of this illustrative embodiment constitutes a framework of a seat back 2 of a vehicle seat 1 which is configured as a front passenger seat of an automobile (vehicle). Here, the vehicle seat 1 has the seat back 2 which configures a backrest for a passenger seated in the seat, a seat cushion 3 which configures a sitting portion of the seat, and a headrest 4 which configures a headrest portion of the seat.

The seatback 2 is connected to both left and right side rear end portions of the seat cushion 3 at both left and right side lower end portions thereof with circular disk-shaped recliners (not shown) interposed respectively therebetween. The each recliner functions as a rotational shaft device which can stop rotating when required. This enables the seatback 2 to be connected to the seat cushion 3 such that the angle of the backrest can be adjusted. The seat cushion 3 is provided on a floor of the vehicle with a pair of left and right slider devices (not shown) interposed therebetween. This enables the seat cushion 3 to be adjusted in its front-rear position in relation to the floor of the vehicle. The basic structures of the recliners and the slider devices (not shown) are similar to those described in documents such as JP-A-2011-116303, JP-A-2010-221935 and the like, and therefore, a detailed description thereof will be omitted here.

The headrest 4 is mounted at an upper portion of the seatback 2. Specifically, two rod-shaped stays which project from a lower portion of the headrest 4 are inserted respectively into cylindrical support members (not shown) from above which are installed individually in two holders 13 which are fixed to an upper frame 12 of the back frame 10, whereby the headrest 4 is fixedly mounted at the upper portion of the seatback 2. The configuration in which the headrest 4 is mounted on the seatback 2 by inserting the stays (not shown) of the headrest 4 respectively into the holders 13 which are fixed to the back frame 10 is similar to that described in documents such as JP-A-2008-239075 and the like, and therefore, the description thereof will be omitted here.

Figure 2:
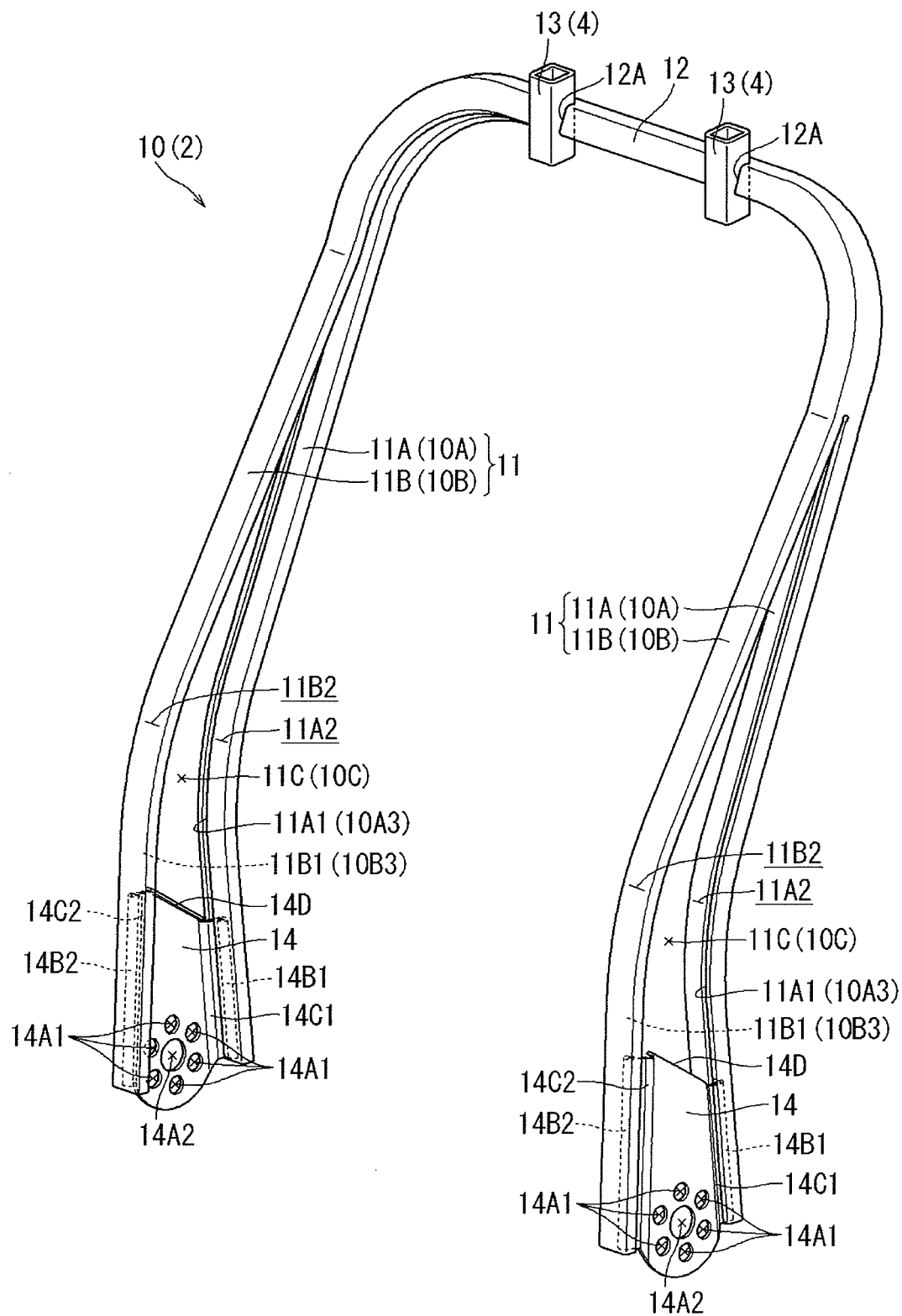
FIG. 2 is a perspective view of the back frame according to the illustrative embodiment.
Figure 3:
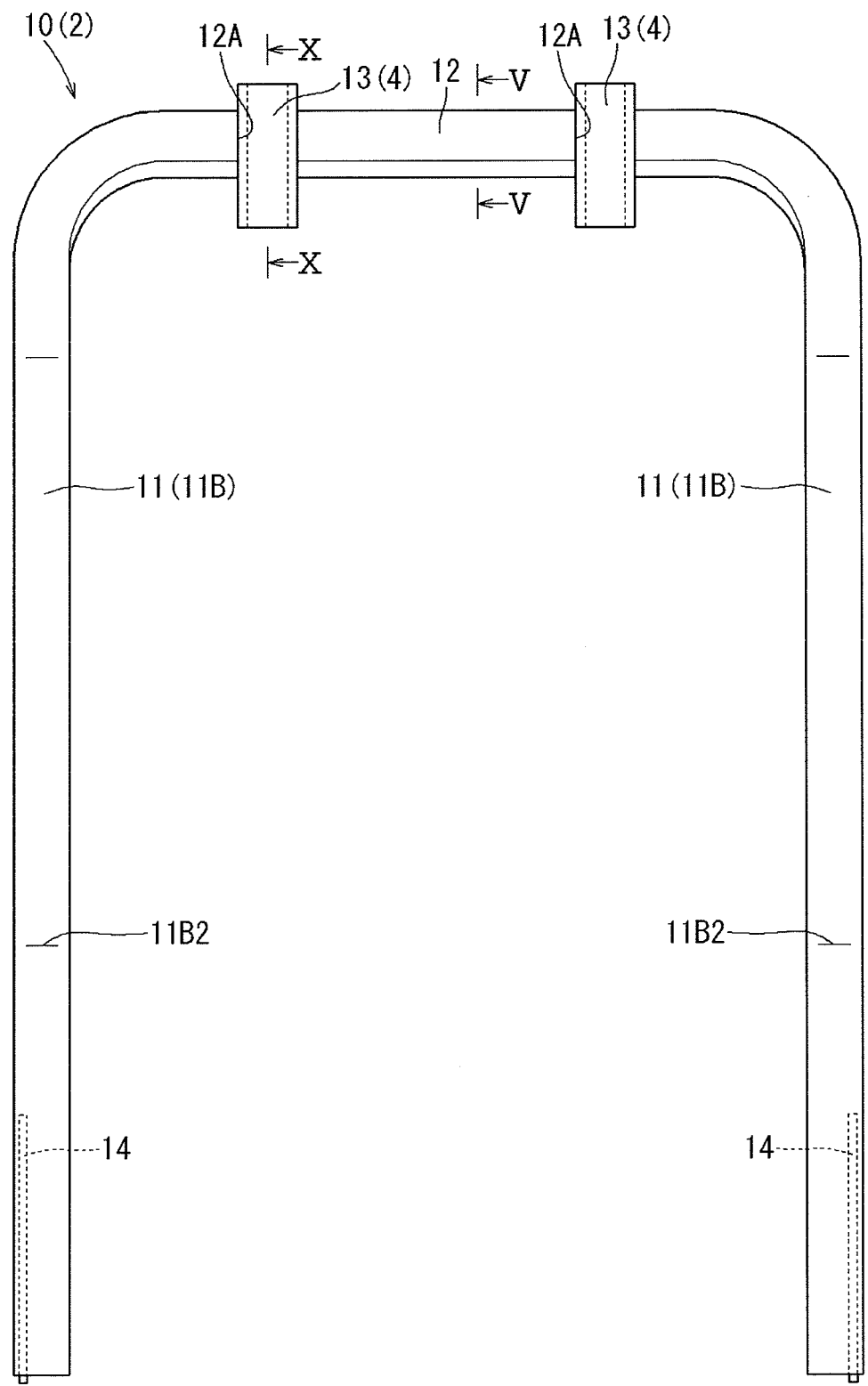
FIG. 3 is a front view of the back frame according to the illustrative embodiment.
Figure 4:
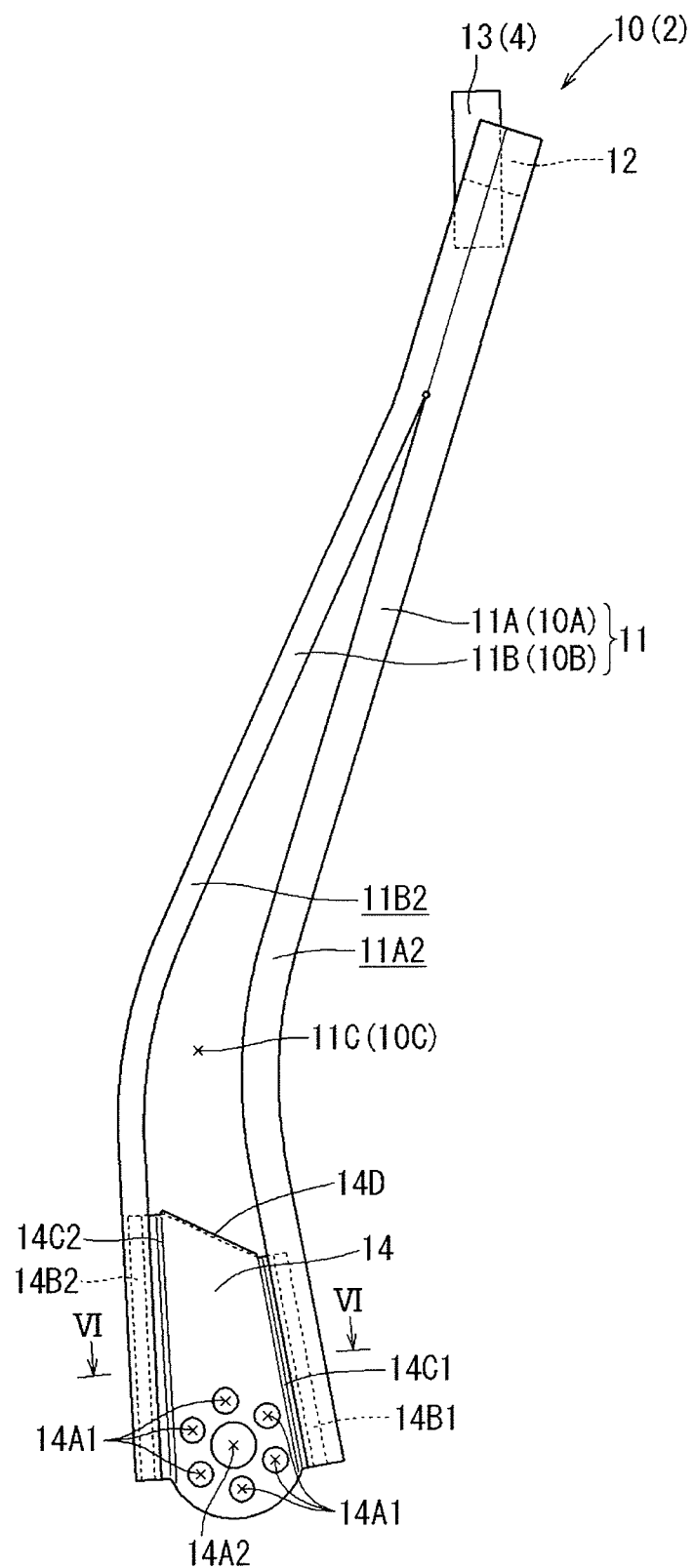
FIG. 4 is a side view of the back frame according to the illustrative embodiment.

Hereinafter, referring to FIGS. 2 to 10, a specific configuration of the back frame 10 will be described. As shown in FIGS. 2 to 4, the back frame 10 includes frame bodies 11 which configure frameworks of left and right side portions of the seatback 2 and which are each bifurcated to define an opening between bifurcated branches, the upper frame 12 which configure a framework of an upper side portion of the seatback 2, the two angularly cylindrical holders 13 which are joined to the upper frame 12 in two left and right positions thereon, and brackets 14 which are made of a high tensile steel sheet and which are joined to lower end portions of the frame bodies 11, respectively. Herein, the frame bodies 11 and the upper frame 12 may be collectively referred to as a frame body.

Figure 7:
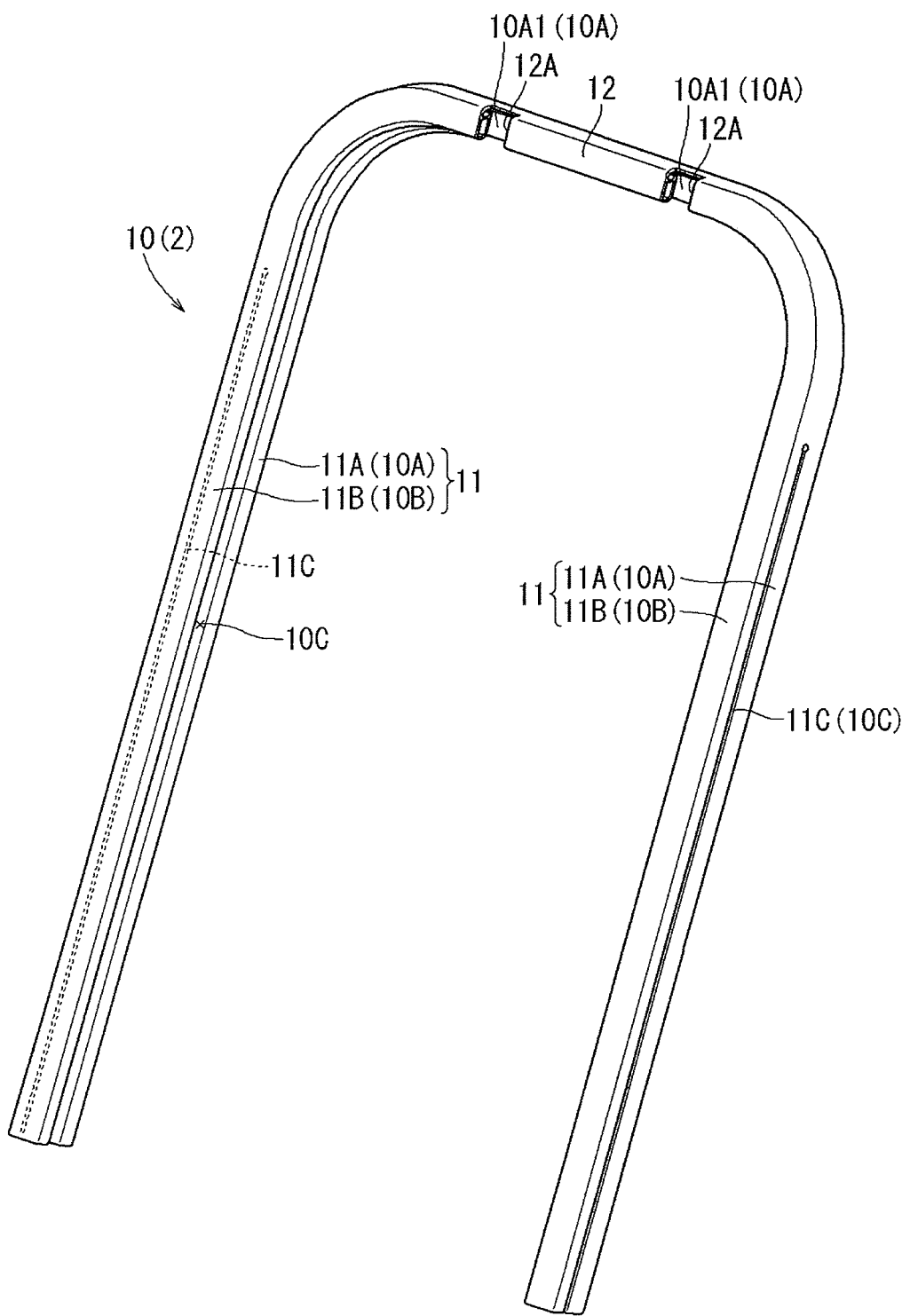
FIG. 7 is a perspective view of a frame body according to the illustrative embodiment and shows the frame body before bent.

The back frame 10 is formed as described below. Firstly, as shown in FIG. 7, a single extruded member of an aluminum alloy is pressed to be bent into an inverted U shape, and in this bent extruded member, the frame bodies 11 and the upper frame 12 are provided in continuously integrally. Before or after the extruded member is bent, a slit 11C is made in each of the frame bodies 11 such that each of the frame bodies 11 can be bifurcated afterwards so as to define an opening between two branches (a slit forming step). Additionally, cutouts 12A are formed in the upper frame 12 in positions (refer to FIG. 9) where the holders 13 are to be joined together such that the holders 13 can be fitted thereinto from a front side of the seat (a cutout forming step). Forming the slits 11C and the cutouts 12A in this stage (where the back frame 10 has not been bent yet in the front-rear direction of the vehicle and hence still remains flat) facilitate the slit forming work and the cutout forming work since the slits 11C only needs to be made in a straight line and the back frame 10 can easily be set on a cutting jig when the cutouts 12A are cut. Each slit 11C is made straight so as to extend from a position lying near an upper end side through a lower end side of each frame body 11. It is noted that the slits 11C and cutouts 12A may be formed in the upper frame 12 after a bent process and an open process performed on the back frame 10 as will be described below.

Figure 8:
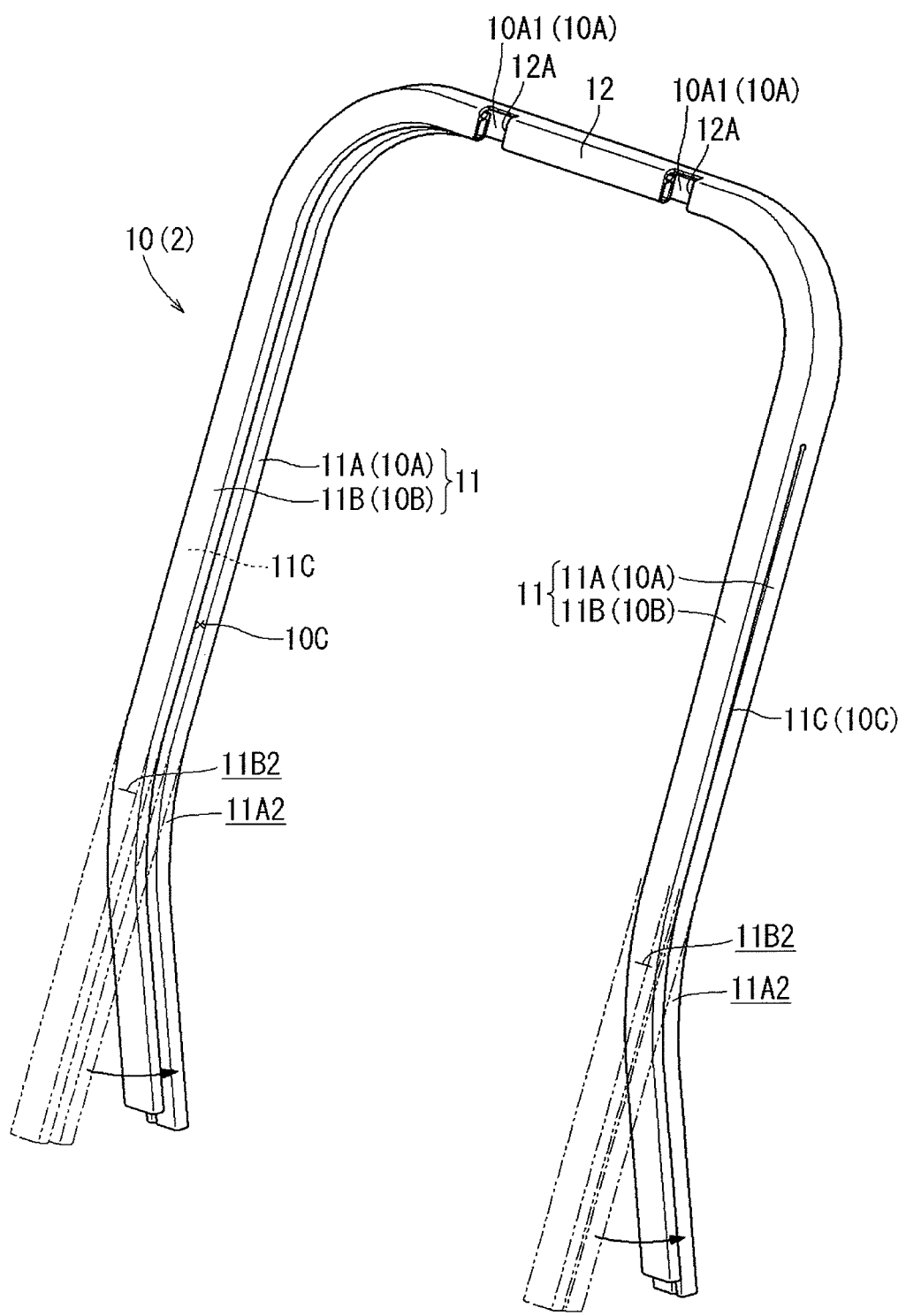
FIG. 8 is a perspective view of the frame body according to the illustrative embodiment and shows how to bend the frame body.

Next, as shown in FIG. 8, the back frame 10 is pressed such that the frame bodies 11 are bent towards the rear of the seat at middle portions thereof into an arch shape (a bending step). Specifically, the back frame 10 is pressed such that respective branch frames 11A, 11B of the frame bodies 11 which are aligned in front and rear of the slits 11C made in the frame bodies 11 are pressed to be bent towards the rear of the seat altogether. Accordingly, the branch frames 11A, 11B are pressed to be bent into the same curved shape in the front-rear direction in which they are aligned, whereby bent portions 11A2, 11B2 are formed at the middle portions of the frame bodies 11 where the shapes of the bent branch frames 11A, 11B coincide with each other.

Figure 9:
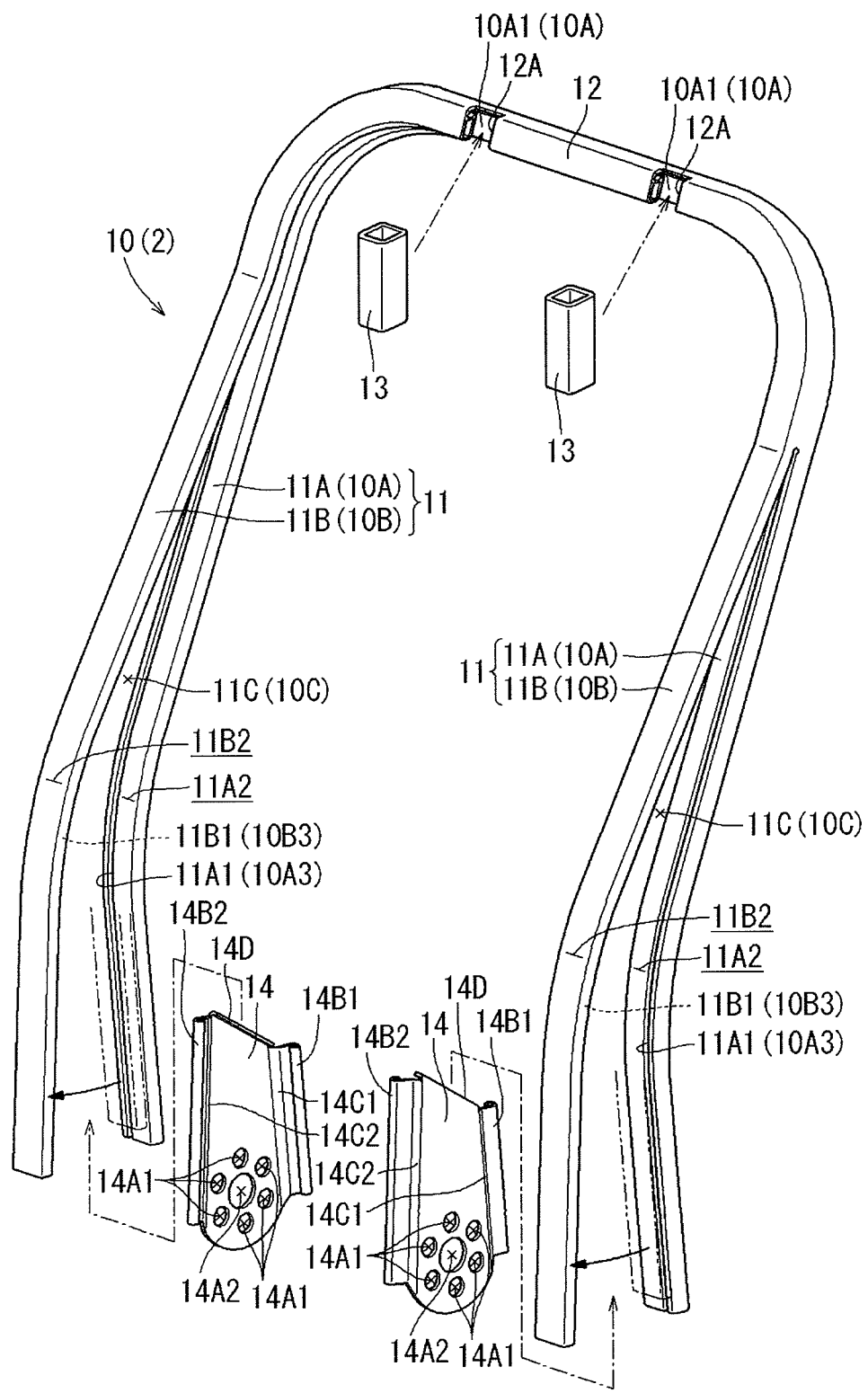
FIG. 9 is an exploded perspective view of the back frame according to the illustrative embodiment.

Next, as shown in FIG. 9, the front branch frames 11B of the frame bodies 11 are bent towards the front of the seat so as to be separated apart from the rear branch frames 11A (a separating step). Specifically, the front branch frames 11B are bent towards the front of the seat from upper ends thereof which constitute starting points of separation or branching as a fulcrum so as to be separated apart from the rear branch frames 11A. This enables the frame bodies 11 to be bifurcated in the front-rear direction so as to define an opening between the separated branch frames such that a front-rear width or space of the opening gradually expands from the upper end side to the lower end side of the frame bodies 11.

Next, the brackets 14 which are made of the high tensile steel sheet are inserted into the widely opened end portions of the frame bodies 11 to be assembled into the frame bodies 11 integrally (an assembling step). Further, the holders 13 are fitted into the cutouts 12A which are cut in the upper frame 12 in the cutout forming step and are then joined thereto integrally by welding. Accordingly, as shown in FIGS. 2 to 4, the back frame 10 is formed in which the frame bodies 11 are bifurcated to define the opening between the front and rear branch frames into which the brackets 14 are inserted. Therefore, not only can the weight of the back frame 10 be reduced but also the structural strength thereof can be enhanced.

Figure 5:
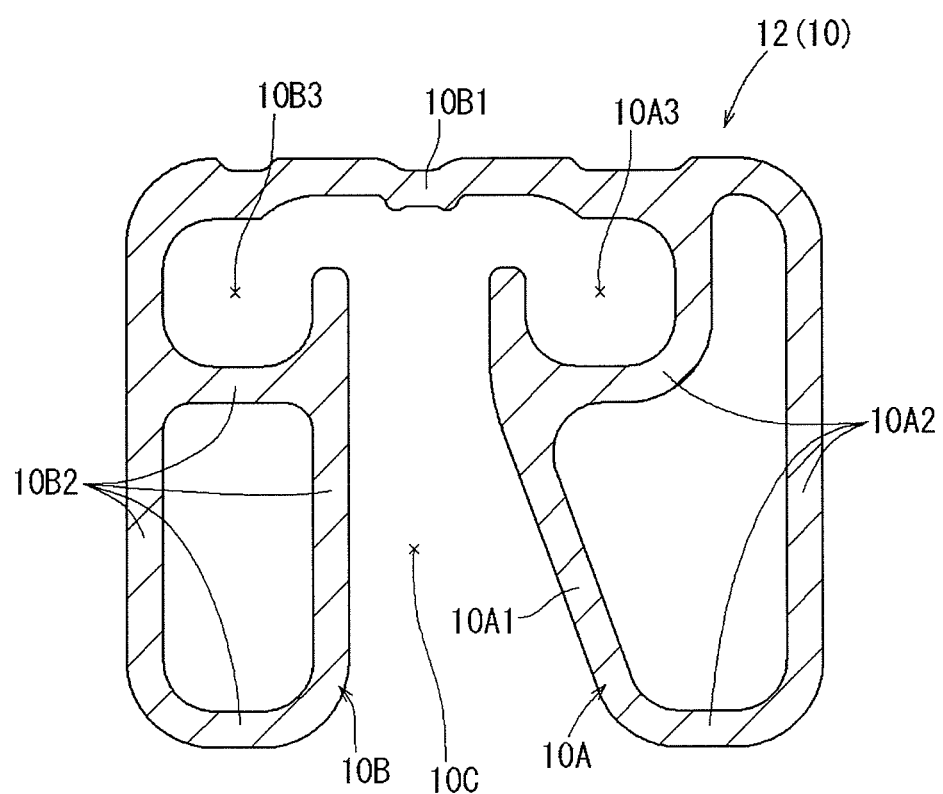
FIG. 5 is an enlarged sectional view taken along the line V-V in FIG. 3.

Next, configurations of several portions of the back frame 10 will be described in more detail. A cross-sectional shape of the back frame 10 which is made of aluminum alloy by extrusion molding includes a first cross-sectional portion 10A which has a closed cross section and a second cross-sectional portion 10B which has a closed cross section. The first cross-sectional portion 10A and the second cross-sectional portion 10B is connected together while being aligned in front and rear in the front-rear direction, as shown in FIG. 5. As described in FIG. 7, when it is bent into the inverted U shape, the back frame 10 is bent in a direction which is perpendicular to the direction in which the first cross-sectional portion 10A and the second cross sectional portion 10B are aligned while the first cross-sectional portion 10A and the second cross-sectional portion 10B are kept in a positional relationship along the full circumference of the back frame 10 such that the second cross-sectional portion 10B is positioned in front of the first cross-sectional portion 10A and the first cross-sectional portion 10A is positioned rear of the second cross-sectional portion 10B. This enables the frame bodies 11 and the upper frame 12 to extend along the full circumference of the back frame 10 while keeping the same shapes from an inner circumferential side towards an outer circumferential side of the back frame 10 in a where the back frame 10 is bent into the inverted U shape.

As shown in FIG. 5, the first cross-sectional portion 10A has an attachment surface portion 10A1 formed into a flat plane which faces the front side of the seat, and reinforcement surface portions 10A2 which extend towards the rear of the seat from edge portions of the attachment surface portion 10A1 to connect to each other to thereby form a cross-sectional shape which is closed in an endless manner. Accordingly, the first cross-sectional portion 10A is formed to have the closed cross-sectional shape. Specifically, the attachment surface 10A1 is formed into a flat plane which is inclined obliquely towards the inner circumferential side (the lower side in FIG. 5) of the back frame 10 in relation to a front side thereof.

The second cross-sectional portion 10B has a connecting surface portion 10B1 which extends to the front from an edge portion of the first cross-sectional portion 10A at the outer circumferential side (an upper side in FIG. 5) of the back frame 10 and a closed cross-sectional portion 10B2 which extends from a front edge portion of the connecting surface portion 10B1 towards the inner circumferential side (the lower side in FIG. 5) of the back frame 10 and which is then wound around to the rear to connect back to itself to define a closed cross section. An opening portion 10C which configures a gap is formed between the closed cross-sectional portion 10B2 of the second cross-sectional portion 10B and the attachment surface portion 10A1 of the first cross-sectional portion 10A which is positioned rear of the closed cross-sectional portion 10B2. This opening portion 10C is formed to be opened towards the inner circumferential side (the lower side in FIG. 5) of the back frame 10. Specifically, the opening portion 10C is formed to be opened gradually widely towards the inner circumferential side (the lower side in FIG. 5) of the back frame 10 while the attachment surface portion 10A1 is inclined as described above.

A rail groove 10A3 is formed at a portion where the first cross-sectional portion 10A is connected to the connecting surface portion 10B1. The rail groove 10A3 has a pocket-like space formed therein by depressing the cross section defined by the reinforcement surface portions 10A2 towards the rear of the seat. This rail groove 10A3 has a rectangular open surrounded cross-sectional shape which is opened at a front side thereof. Additionally, a rail groove 10B3 is formed at a portion of the second cross-sectional portion 10B where the connecting surface portion 10B1 is connected to the closed cross-sectional portion 10B2. The rail groove 10B3 has a pocket-like space formed therein by depressing the cross section of the closed cross-sectional portion 10B2 towards the front of the seat. This rail groove 10B3 has a rectangular open surrounded cross-sectional shape which is opened at a rear side thereof symmetrically with the rail groove 10A3 in relation to the front-rear direction. These rail grooves 10A3, 10B3 communicate with each other in the front-rear direction through the opening portion 10C. Namely, the rail grooves 10A3, 10B3 are opened to the inner circumferential side (the lower side in FIG. 5) of the back frame 10 through the opening portion 10C, while the rail grooves 10A3, 10B3 are covered from the outer circumferential side (an upper side in FIG. 5) by the connecting surface portion 10B1.

Figure 6:
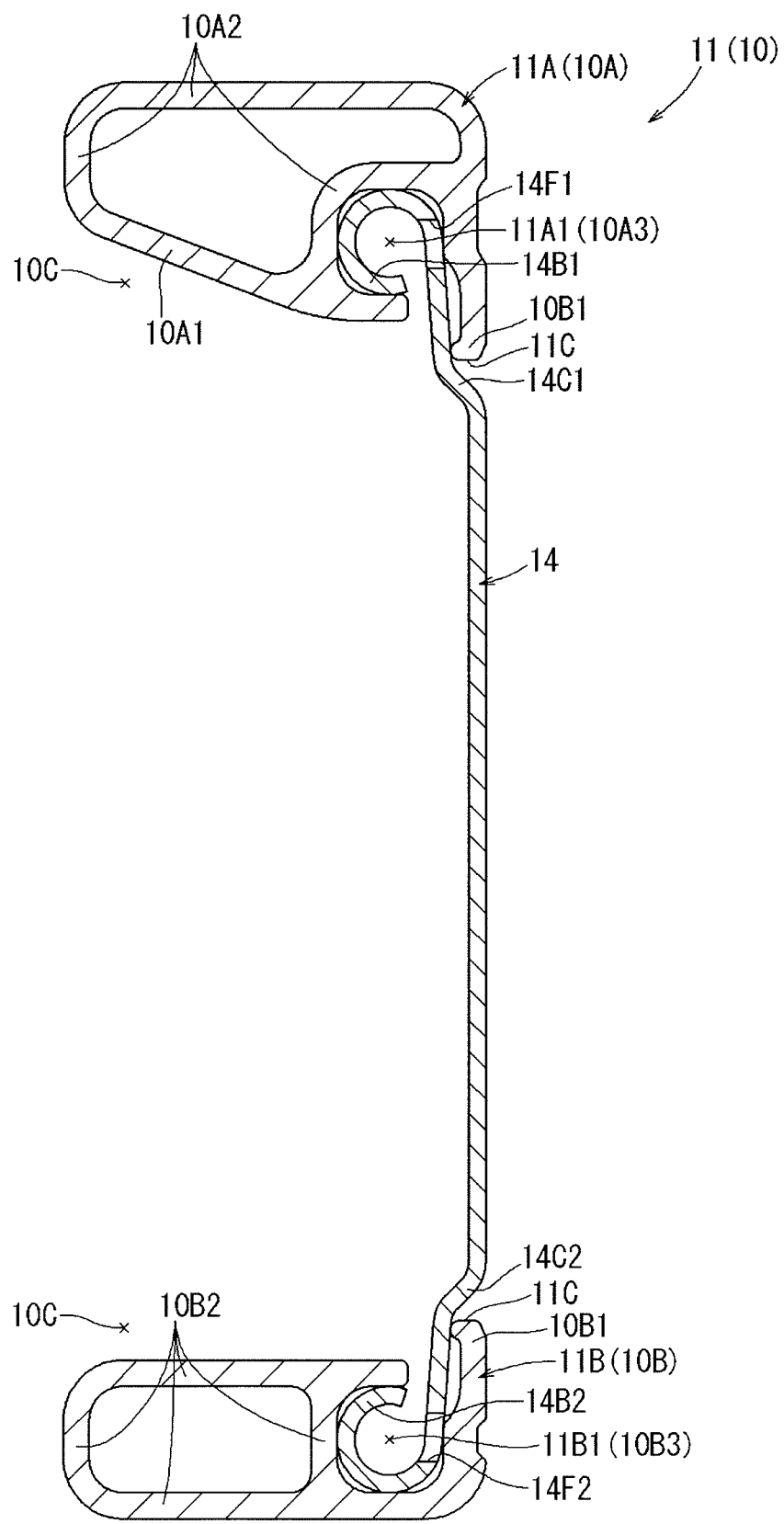
FIG. 6 is an enlarged sectional view taken along the line VI-VI in FIG. 4.

The slit 11C which is formed in each of the frame bodies 11 as described in FIG. 7 are formed along the connecting surface portion 10B1 (refer to FIG. 5) which configures a connecting surface between the first cross-sectional portion 10A and the second cross-sectional portion 10B (refer to FIG. 6).

Consequently, as shown in FIGS. 6 and 9, by dividing each of the frame bodies 11 into the two branch frames from the slit 11C, the opening portion 10C between the first cross-sectional portion 10A and the second cross-sectional portion 10B is expanded, whereby the first cross-sectional portion 10A and the second cross-sectional portion 10B can be separated from each other in the front-rear direction. This allows the separated branch frames 11A, 11B to have the closed cross-sectional shapes which give high structural strengths thereto.

Then, as shown in FIG. 9, the bracket 14 which is made of the high tensile steel sheet is inserted into the open (lower) end portion of each of the frame bodies 11 which is divided into the two branch forms, from below for attachment. Here, the bracket 14 which is made of the high tensile steel sheet has a specific strength which is higher than that of the frame bodies 11 which are formed of the aluminum alloy by extrusion molding. The brackets 14 are inserted respectively into the open end portions of the frame bodies 11 which are each bifurcated so as to be fitted between end portions of the branch frames 11A, 11B in a wedge-like manner. Thus, the brackets 14 configure bridge members which join the end portions of the branch frames 11A, 11B together to thereby function as reinforcement plates which enhance the structural strengths at the open end portions of the frame bodies 11.

The brackets 14 which are attached to the corresponding frame bodies 11 are set as joining portions with the recliners when the left and right lower end portions of the back frame 10 are connected to the left and right side rear end portions of the seat cushion 3 via the recliners (not shown) as shown in FIG. 1. Specifically, when attached to the lower end portions of the frame bodies 11, the brackets 14 are oriented in a width direction of the seat as shown in FIG. 2. A plurality of fitting holes 14A1 used to join the bracket 14 to the recliner (not shown) and a shaft hole 14 through which an operation shaft (not shown) used to unlock the recliner are formed in sheet surfaces of the brackets 14 so as to penetrate the brackets 14 in an axial direction.

As shown in FIG. 9, cylindrical projections 14B1, 14B2 are formed at front and rear edge portions of each of the brackets 14, and these cylindrical projections are rolled inwards towards the inner circumferential side of the back frame 10 into a cylindrical shape. These cylindrical projections 14B1, 14B2 are forcefully inserted into the corresponding rail grooves 11A1, 11B1 (10A3, 10B3) which are formed in the branch frames 11A, 11B, respectively, when the bracket 14 is inserted between the branch frames 11A, 11B of the corresponding frame body 11. Specifically, the cylindrical projections 14B1, 14B2 are each rolled into the cylindrical shape whose outside diameter is larger than an inner diameter of the rail grooves 11A1, 11B1 (10A3, 10B3). When the cylindrical projections 14B1, 14B2 are press-fitted into the corresponding rail grooves 11A1, 11B1 (10A3, 10B3), the cylindrical projections 14B1, 14B2 are strongly secured thereto. Thus, the cylindrical projections 14B1, 14B2 are strongly and firmly engaged with the corresponding rail grooves 11A1, 11B1 (10A3, 10B3) so as not to be removed therefrom in a perpendicular direction to the direction in which they are inserted (press-fitted) (refer to FIG. 6). Here, the rail grooves 11A1, 11B1 are an example of a press-fitting portion.

Here, as shown in FIG. 9, the branch frames 11A, 11B of each frame body 11 are formed so as to be spaced wider than a front-rear width of the bracket 14 apart from each other in the bifurcated manner. By forming the branch frames 11A, 11B as described above, when the bracket 14 is inserted between the branch frames 11A, 11B, the cylindrical projections 14B1, 14B2 of the bracket 14 are inserted into the rail grooves 11A1, 11B1 of the branch frames 11A, 11B to be brought into engagement therewith. Then, the branch frames 11A, 11B are forced to elastically approach each other to contract the opening space defined therebetween so as to match it to the front-rear width of the bracket 14 as the bracket 14 is progressively inserted between the branch frames 11A, 11B due to the engagement structure between the cylindrical projections 14B1, 14B2 and the rail grooves 11A1, 11B1 and the rigidity of the bracket 14 which is provided by the high specific strength thereof, whereby the opening width defined between the divided branch frames 11A, 11B can be changed accordingly. Consequently, in a state where the bracket 14 is inserted into the frame body 11 as a result of the elastic deformation of the branch frames 11A, 11B, opening spring-back forces generated when the branch frames 11A, 11B attempt to return in their restoring directions are exerted on the bracket 14, and these spring-back forces act to enhance further the joining force to join the bracket 14 to the frame body 11, whereby the bracket 14 and the frame body 11 are held such that they are joined together more strongly and rigidly.

On the other hand, the branch frames 11A, 11B may be formed to be spaced narrower than the front-rear width of the bracket 14 apart from each other. In this case also, when the bracket 14 is inserted between the branch frames 11A, 11B, the cylindrical projections 14B1, 14B2 of the bracket 14 are inserted into the rail grooves 11A1, 11B1 of the branch frames 11A, 11B to be brought into engagement therewith. Then, branch frames 11A, 11B are forced to elastically move away from each other to spread the opening space defined therebetween so as to match it to the front-rear width of the bracket 14 as the bracket 14 is progressively inserted between the branch frames 11A, 11B due to the engagement constructions between the cylindrical projections 14B1, 14B2 and the rail grooves 11A1, 11B1 and the rigidity of the bracket 14 which is provided by the high specific strength thereof, whereby the opening width defined between the divided branch frames 11A, 11B can be changed accordingly. Consequently, in a state where the bracket 14 is inserted into the frame body 11 as a result of the elastic deformation of the branch frames 11A, 11B, closing spring-back forces generated when the branch frames 11A, 11B attempt to return in their restoring directions are exerted on the bracket 14, and these spring-back forces act to enhance further the joining force to join the bracket 14 to the frame body 11, whereby the bracket 14 and the frame body 11 are held such that they are joined together more strongly and rigidly.

Here, although the branch frames 11A, 11B of each frame body 11 are formed to be bent towards the rear of the seat into the arch-like shape at their middle portions which constitute the bent portions 11A2, 11B2, areas of the branch frames 11A, 11B located below the bent portions 11A2, 11B2 between which the bracket is inserted are formed straight so as to extend straight downwards. Because of this, the rail grooves 11A1, 11B1 which are formed in the branch frames 11A, 11B, respectively, are also formed similarly straight to extend straight downwards. Similarly, the cylindrical projections 14B1, 14B2 which are formed along the side portions of each bracket 14 are also formed into the straight cylindrical shape which extends straight in the height direction while being aligned almost parallel to each other. These configurations allow the bracket 14 to be inserted smoothly into the corresponding frame body 11 without being interrupted halfway.

Additionally, as shown in FIG. 6, step portions 14C1, 14C2 are formed by the edge portions of the bracket 14 along which the cylindrical projections 14B1, 14B2 are formed such that a central portion of the bracket 14 projects further outwards (towards the outer circumferential side of the back frame 10: towards a right side in FIG. 6) than both the edge portions. By forming these step portions 14C1, 14C2, in a state where the bracket 14 is attached to the corresponding frame body 11 with the cylindrical projections 14B1, 14B2 on the edges thereof inserted in the corresponding rail grooves 11A1, 11B1, the bracket 14 is positioned such that a central plate portion of the bracket 14 becomes same level as outer surfaces of the branch frames 11A, 11B of each frame body 11. Additionally, as shown in FIG. 9, a flange 14D is formed at an upper edge portion of each bracket 14 by pressing, and this flange 14D is bent towards the inner circumferential side of the back frame 10. This flange 14D enhances the structural strength of the bracket 14 against bending and twisting and gives an inwardly round shape to the upper edge portion of the bracket 14 so as not to expose an angular shape to the outside.

The structural strength of the back frame 10 is enhanced effectively since the lower open end portion of the frame body 11 which is bifurcated is closed by the member having the high structural strength while fitting the bracket 14 having the high specific strength into the lower end portion of the frame body 11 which is bifurcated widely for integral attachment thereto. This enables the back frame 10 to receive to support stably the load of the back rest which is given thereto from the back portion of the seated passenger by the structure in which the lower end portions of the frame bodies 11 are supported in a cantilever manner.

Here, in each bracket 14, the upper edge portion of the plate portion which is interposed between the branch frames 11A, 11B where the flange 14D is formed so as to be inclined straight obliquely upwards to the front. This allows a rate at which the structural strength (the coefficient of the cross section) which is enhanced by the attachment of the bracket 14 changes in the height direction of the frame body 11 to be adjusted to be moderate in the area where the bracket 14 is formed into the inclined shape. Specifically, the upper edge portion of the bracket 14 is formed to rise gradually to the front, and this allows the bracket 14 to receive a load exerted on the back frame 10 from the front in a higher position, whereby the back frame 10 is allowed to support more firmly the load exerted thereon from the front than a case where the upper edge portion of the bracket 14 is inclined in an opposite way (so as to rise gradually to the rear).

Consequently, when a large load is exerted on the back frame 10 as a result of the back portion of the seated passenger being strongly pressed against the back frame 10 due to the vehicle in a collision at a rear portion thereof, the large load is firmly received and supported by the brackets 14 which project to the higher position at the front thereof. Additionally, a portion where the rate changes drastically at which the structural strength of the back frame 10 changes is eliminated from the bracket 14 by forming the upper edge portion of the bracket 14 into the inclined shape, and this prevents a local stress concentration from occurring in the back frame 10, whereby the large load is dispersed widely so as to be received by the whole of the back frame 10.

Similarly to the back frame 10, the holders 13 which are attached to the upper frame 12 in two left and right positions as shown in FIG. 9 are made of an extruded member of aluminum alloy. These holders 13 are formed into a quadrangular cylindrical shape and are fitted in the corresponding cutouts 12A which are cut in the back frame 12 in the two left and right position from the front of the seat and are then joined strongly and integrally to the upper frame 12 by welding.

Figure 10:
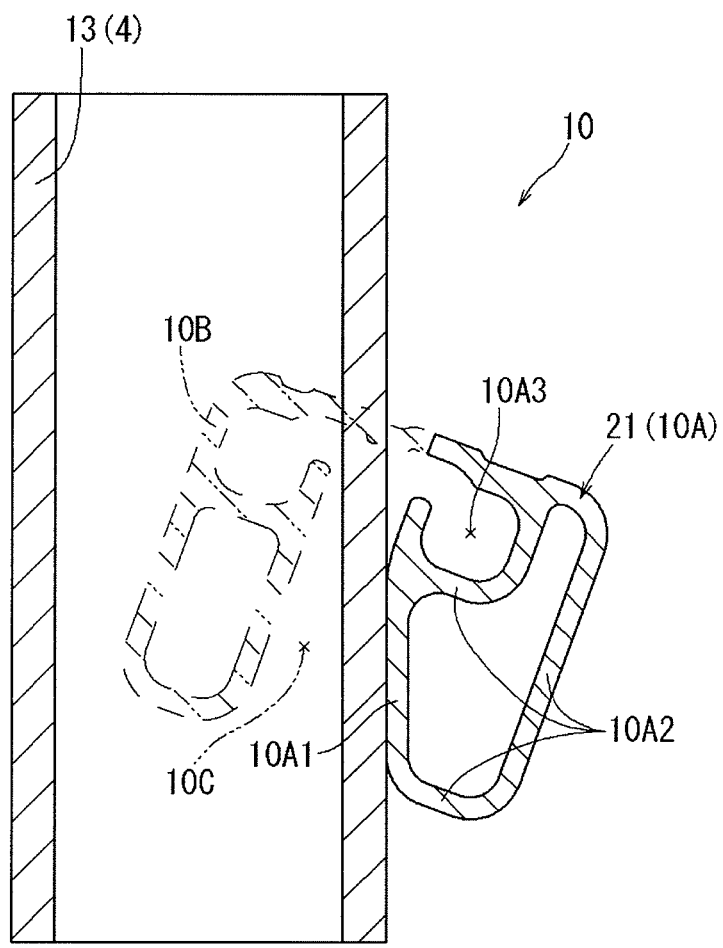
FIG. 10 is an enlarged sectional view taken along the line X-X in FIG. 3.

Here, each cutout 12A is formed by cutting and penetrating partially the second cross-sectional portion 10B of the upper frame 12 as shown in FIGS. 9 and 10, and by cutting through the upper frame 12 in this manner, the attachment surface portion 10A1 of the first cross-sectional portion 10A is exposed towards the front of the seat from which the holder 13 is fitted in the cutout 12A. Each cutout 12A has the same lateral width as that of each holder 13 as shown in FIGS. 3 to 9. When the holder 13 is fitted in the cutout 12A from the front of the seat, a rear surface portion of the holder 13 is placed on the corresponding attachment surface portion 10A1 of the upper frame 12 so as to be in abutment therewith. Additionally, when the holder 13 is fitted in the cutout 12A, the holder 13 is restrained from moving in a width direction of the seat by an end face configuration of the second cross-sectional surface portion 10B which faces the cutout 12A. After the holders 13 are fitted in the corresponding cutouts 12A, abutment surfaces of the holders 13 and the upper frame 12 are joined together by welding, whereby the holders 13 and the cutouts 12A are joined strongly and integrally.

In welding the holders 13 and the cutouts 12A together, since the lateral width of each cutout 12A is the same as that of each holder 13, when the holder 13 is fitted in the corresponding cutout 12A, the abutment portions therebetween are exposed along the full outer circumference of the cutout 12A so as be seen from the outside. Specifically, the cutout 12A is formed by being cut such that an edge portion of the connecting surface portion 10B1 which faces the front of the seat is brought into abutment with the rear surface portion of the holder 13 in a state where the holder 13 is fitted in the cutout 12A to be brought into surface abutment with the corresponding attachment surface portion 10A1 as shown in FIG. 10. Consequently, all the abutment portions between the holder 3 and the cutout 12A which are exposed to the outside when the holder 13 is assembled in the cutout 12A can be welded, and by welding all the abutment portions, the holder 13 and the cutout 12A are welded together over a long welding length to thereby be joined strongly and integrally.

Incidentally, as described in relation to FIG. 9, the frame bodies 11 of the back frame 10 are bent towards the rear of the seat so as to be curved into the arch-like shape, and because of this, normally, the seat back 10 is used in a posture where the seat back 10 is inclined slightly towards the rear of the seat from its vertical posture. In these circumstances, the attachment surface portion 10A1 of the upper frame 12 on which the holder 13 is placed to be brought into surface abutment therewith faces almost straight the front of the seat (refer to FIG. 10). Consequently, each attachment surface portion 10A1 can support the corresponding holder 13 from the rear of the seat while facing straight the holder 13, whereby the load exerted on the headrest 4 (refer to FIG. 1) from the front of the seat can be supported well at the upper frame 12.

In addition, as described above, the frame bodies 11 of the back frame 10 are bent towards the rear of the seat so as to be curved into the arch-like shape at the middle portions thereof (to thereby form the bent portions 11A2, 11B2), whereby the frame bodies 11 are formed so as to project largely to the front of the seat in positions which face both sides of a waist portion of the seated passenger. This enables side support portions to be set largely so as to support the waist portion of the seated passenger from both sides thereof or the waist portion of the seated passenger to be supported strongly in a position which lies nearer to the front of the seat. The frame bodies 11 of the back frame 10 are formed so as to be warped towards the rear of the seat, whereby it is possible to ensure a large leg space where a passenger seated in a rear seat can stretch his or her legs to the front.

Figure 11:
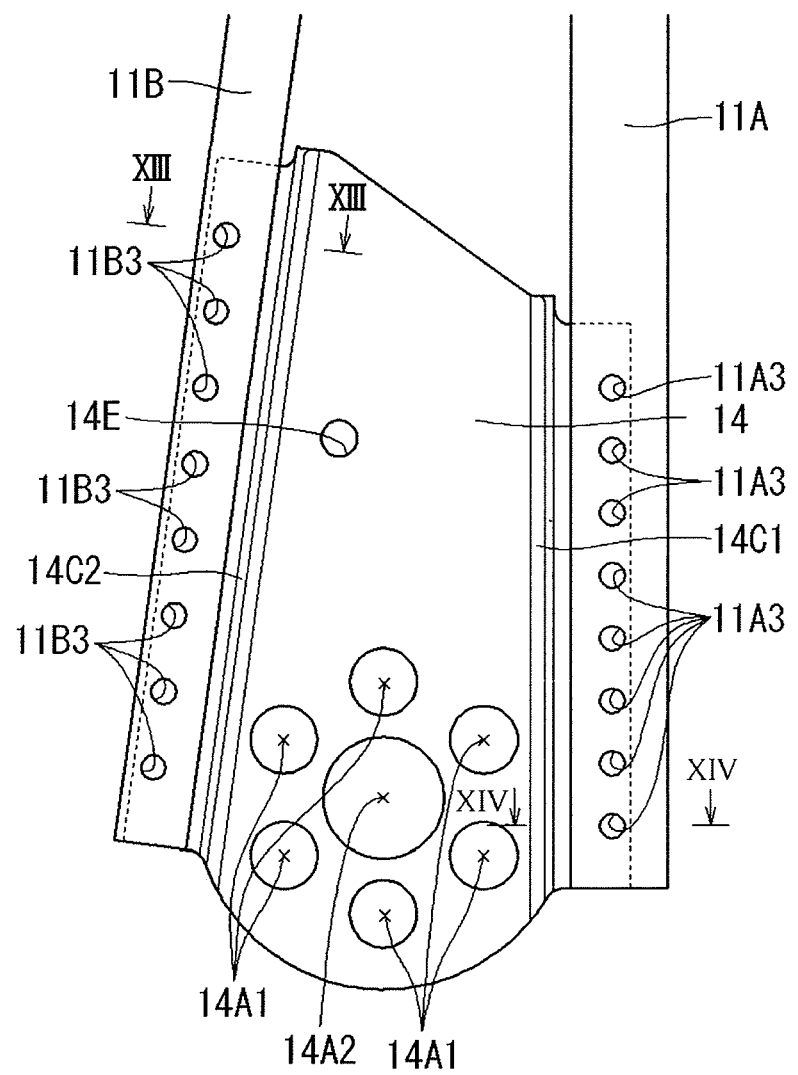
FIG. 11 is an enlarged side view of the periphery of a recliner attachment bracket in the back frame according to the illustrative embodiment.
Figure 12:
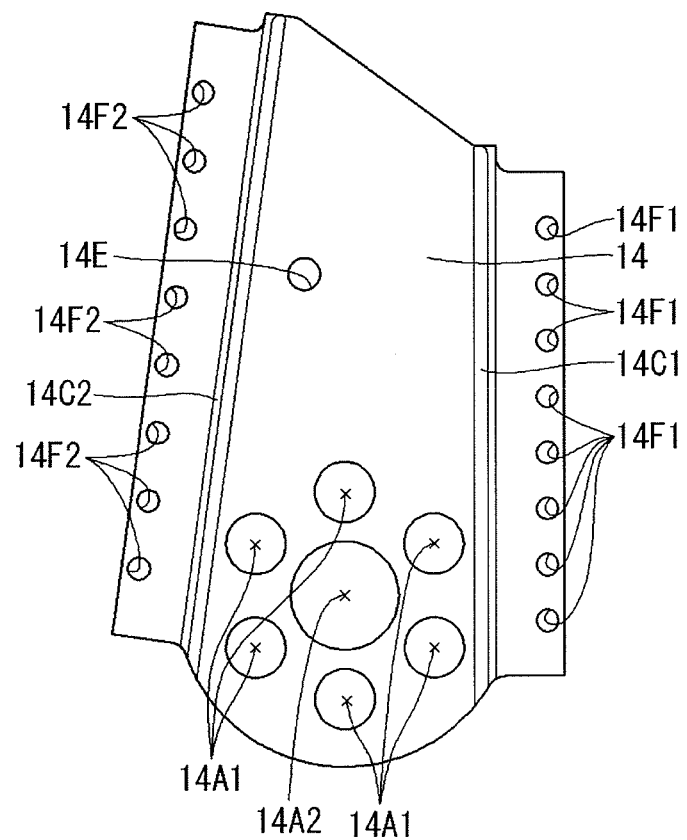
FIG. 12 is a front view of the recliner attachment bracket according to the illustrative embodiment.
Figure 13:
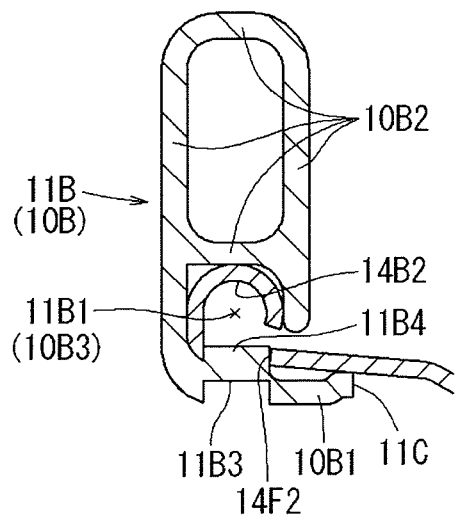
FIG. 13 is an enlarged sectional view taken along the line XIII-XIII in FIG. 11.
Figure 14:
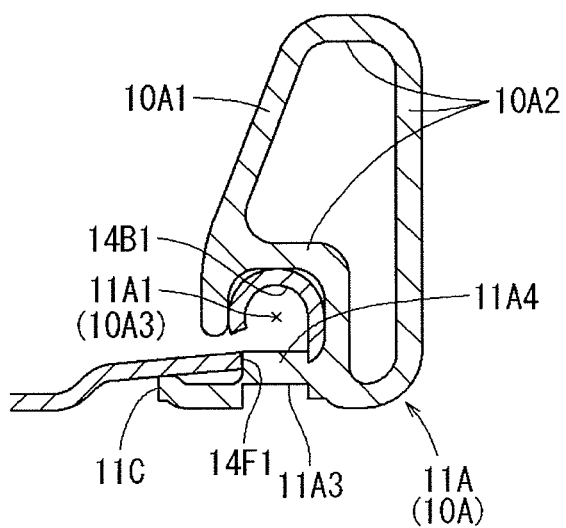
FIG. 14 is an enlarged sectional view taken along the line XIV-XIV in FIG. 11.

Although an explanation is omitted in the above description, as shown in FIGS. 6 and 12, a plurality of through holes 14F1, 14F2 are provided in side portions of each bracket 14 along the direction in which the bracket 14 is press-fitted in the rail grooves 11A1, 11B1 of the branch frames 11A, 11B. Then, as shown in FIGS. 11 to 14, projections 11A4, 11B4 are fitted in the corresponding through holes 14F1, 14F2 of the bracket 14. The projections 11A4, 11B4 are formed such that the branch frames 11A, 11B are fixed to a press table such that the bracket 14 is press-fitted in the rail grooves 11A1, 11B1 of the branch frames 11A, 11B and punching is performed in positions on the branch frames 11A, 11B which correspond respectively to the through holes 14F1, 14F2 in the bracket 14, whereby the projections are formed with the portions of the bracket 14 having the high specific strength which are press-fitted in the rail grooves 11A1, 11B1 functioning as a lower die. As this occurs, the through holes 14F1, 14F2 penetrate in a direction which is perpendicular to the press-fitting direction. Punching in this way forms a plurality of crimp marks 11A3, 11B3 on the branch frames 11A, 11B.

As shown in FIGS. 11 and 12, a reference hole 14E is opened near a central portion of the bracket 14 so as to prevent the deviation of the punching positions from the positions where the through holes 14F1, 14F2 are formed when punching is carried out. Thus, the punching positions are determined based on the positions of the through holes 14F1, 14F2 with respect to the reference hole 14E. The reference hole 14E may be omitted by making use of the shaft hole 14A2 described above as a similar reference hole. Additionally, both the reference hole 14E and the shaft hole 14A2 may be used as reference holes. FIG. 6 shows the branch frames 11A, 11B and the bracket 14 before punching is performed. Here, the through holes 14F1, 14F2 (an example of a first engagement part) of the bracket 14 and the projections 11A4, 11B4 (an example of a second engagement part) are an example of an engagement portion.

According to the above-described illustrative embodiment, the projections 11A4, 11B4 which are formed on the branch frames 11A, 11B and the through holes 14F1, 14F2 of the bracket 14 are brought into engagement with each other (or configure the engagement portion) along the press-fitting direction of the bracket 14 into the rail grooves 11A1, 11B1 of the branch frames 11A, 11B. Therefore, the joining strength of the bracket 14 to the branch frames 11A, 11B in the press-fitting direction can be enhanced, whereby it is possible to ensure the strength required by the back frame 10. Moreover, since the bracket 14 and the branch frames 11A, 11B are difficult to be welded together since they are formed of the different materials, employing the welding method deteriorates the productivity. However, in this illustrative embodiment, since the welding method is not employed, the productivity can be improved.

In addition, since the plurality of engagement portions are formed in the press-fitting direction, the load acting on one engagement portion can be dispersed, whereby even though the load resistance of each of the engagement portions is small, the engagement portions can withstand a larger load altogether.

Further, the through holes 14F1, 14F2 are formed in the bracket 14, and punching is performed in the positions on the branch frames 11A, 11B which correspond to the through holes 14F 1, 14F2 in the bracket 14 after the bracket 14 is press-fitted into the rail grooves 11A1, 11B1 of the branch frames 11A, 11B. This allows the projections 11A4, 11B4 to be fitted respectively in the through holes 14F1, 14F2, whereby the engagement portions can easily be formed.

Moreover, since the through holes 14F1, 14F2 are caused to penetrate in the direction which is perpendicular to the press-fitting direction, the projections 11A4, 11B4 which are fitted in the through holes 14F1, 14F2 are formed to project in the same direction, thereby making it possible to enhance the fixing strength against a load which acts in the direction in which the bracket 14 is dislocated from the branch frames 11A, 11B.

While the present invention has been shown and described with reference to certain illustrative embodiments thereof, it will be understood by those skilled in the art that various changes in form and details may be made therein without departing from the spirit and scope of the invention as defined by the appended claims.

1. Engagement portions can also be formed by forming notches in the bracket and providing engagement pieces on the frame body which are brought into engagement with the notches in the bracket. Additionally, when the bracket is formed of a material having a strength which is substantially the same as that of the frame bodies, it is possible to form engagement portions by performing punching at portions where the bracket and the frame bodies are superposed so as to deform the frame bodies and the bracket simultaneously.

2. It is not necessary to provide a plurality of engagement portions, and hence, only one engagement portion may be provided. In addition, in the illustrative embodiment, while the engagement portions are provided on both the sides of the bracket, they may be provided on only one side of the bracket.

3. The bracket is not limited to the recliner attaching bracket. For example, the present invention may also be applied to a lumbar support attaching bracket.

4. In the illustrative embodiment described above, while the inventive concept of the present invention is applied to the vehicle seat, the inventive concept of the present invention may also be applied to seats for airplanes, ships, trains and the like.

What is claimed is:

1. A back frame of a vehicle seat, the back frame comprising:
   a frame body including a press-fitting groove into which a projection of a part attachment bracket is press-fit for attaching a part to the frame body, wherein
   a lower part of the frame body has a rear branch frame and a front branch frame, both of which include the press-fitting groove,
   the projection of the part attachment bracket is press-fit into the press-fitting groove of the rear branch frame and the press-fitting groove of the front branch frame to be held between the rear branch frame and the front branch frame, and
   the press-fitting groove of the frame body and an abutment surface of the bracket define an engagement portion where the frame body and the bracket engage each other in a direction in which the projection is press-fit into the press-fitting groove.

2. The back frame according to claim 1, wherein the press-fitting groove of the frame body and the abutment surface of the bracket define a plurality of engagement portions along the press-fitting direction.

3. The back frame according to claim 1, wherein the engagement portion includes:
   a through hole defined in the abutment surface of the bracket to penetrate through the abutment surface in a direction which is perpendicular to the press-fitting direction; and
   a projection defined in the press-fitting groove of the frame body to fit in the through hole.

4. The back frame according to claim 1, wherein the engagement portion includes:
   a first engagement part defined in the abutment surface of the bracket; and
   a second engagement part defined in the press-fitting groove of the frame body which abuts on the first engagement part in the press-fitting direction.

5. The back frame according to claim 1, wherein the part is a recliner.

6. The back frame according to claim 1, wherein the bracket is a material having specific strength higher than a material of the frame body.

7. The back frame according to claim 1, wherein
   the frame body includes two side frame bodies and an upper frame connecting upper ends of the side frame bodies,
   each of the side frame bodies includes two branch frames which are bifurcated from a branching position and aligned in a front-rear direction of the back frame to define an opening which is open toward a lower side, and
   the bracket is inserted into the press-fitting groove of the frame body from a lower side of the frame body.

8. The back frame according to claim 1, wherein
   the projection of the part attachment bracket is cylindrical.

9. The back frame according to claim 8, wherein
   an outer diameter of the cylindrical projection is larger than an inner diameter of the press-fitting groove.

10. The back frame according to claim 1, wherein
    the bracket includes a flange provided at an upper edge thereof, and
    the flange is inclined downward from a front side of the frame body to a rear side of the frame body.

* * * * *